Oct. 18, 1966  H. J. DONALD  3,279,501
EXTRUSION AND PRODUCT
Filed Jan. 28, 1965

INVENTOR.
Harold Jack Donald
BY
AGENT

United States Patent Office 3,279,501
Patented Oct. 18, 1966

3,279,501
EXTRUSION AND PRODUCT
Harold Jack Donald, Midland, Mich., assignor to The Dow Chemical Company, Midland, Mich., a corporation of Delaware
Filed Jan. 28, 1965, Ser. No. 429,955
4 Claims. (Cl. 138—118)

This application is a continuation-in-part of my copending application Serial No. 277,827, filed May 3, 1963, now abandoned.

This invention relates to the extrusion of thermoplastic resinous materials. It more particularly relates to the extrusion of hollow cylindrical articles such as pipe, tube, and the like.

Considerable difficulty has been encountered in the preparation of plastic tube and pipe with regard to the physical strength of the resultant product. In order to achieve tube and pipe of adequate strength for many practical purposes, it has been necessary to utilize a wall thickness substantially in excess of that which might be reasonably required from an examination of physical properties of the plastic employed. Therefore it has been necessary in order to provide adequate strength to prepare tubes and pipes which had thicker wall sections than might ordinarily be desired from an economical as well as weight standpoint. The process of extrusion frequently incorporates within the walls of the pipe or tube inherent defects or weak areas. Generally such weakened regions comprise linear faults extending lengthwise along the conduit wall and are frequently caused by weld lines. For example, in the extrusion of the tube about a mandrel frequently the plastic material is forced into the extruder die in such a manner that it must be divided and flow about the mandrel. Thus the point at which the incoming stream flows together again often forms what is known as a weld line within the extruded product. Frequently such a weld line is a region of weakness. Oftentimes the internal mandrel of a tubing or pipe die is maintained in centered position by means of a plurality of arm-like supports generally referred to as a spider. These arms extend from the mandrel to the internal walls of the extruder baffle or die and each of the arms is in the path of flow of the thermoplastic resinous material and as the material separates and flows about the arms of the spider, a weld line is usually generated. Frequently plastic pipe in service will fail by longitudinal rupture due to internal pressure and oftentimes, when utilized as a structural member, will exhibit a similar type of failure when an external crushing force or bending moment is applied.

An object of this invention is to provide an improved reinforced thermoplastic resinous tubular article.

A further object of this invention is to provide an extruded thermoplastic resinous tubular article having improved physical characteristics.

Another object of this invention is to provide an extruded thermoplastic resinous pipe having more uniform physical properties.

The present invention is a thermoplastic resinous hollow tubular article having an internal surface and an external surface, the internal surface and the external surface being oriented in a direction other than in a direction generally parallel to the axis of generation of the hollow cylinder, the internal and external surfaces being oriented in substantially different directions. A particularly advantageous embodiment of the invention is achieved when a thermoplastic resinous material containing filamentary reinforcing is employed in the preparation of such a hollow tubular article.

Further features and advantages of the present invention will become more apparent from the following specification when taken in connection with the drawing wherein.

Figure 1:
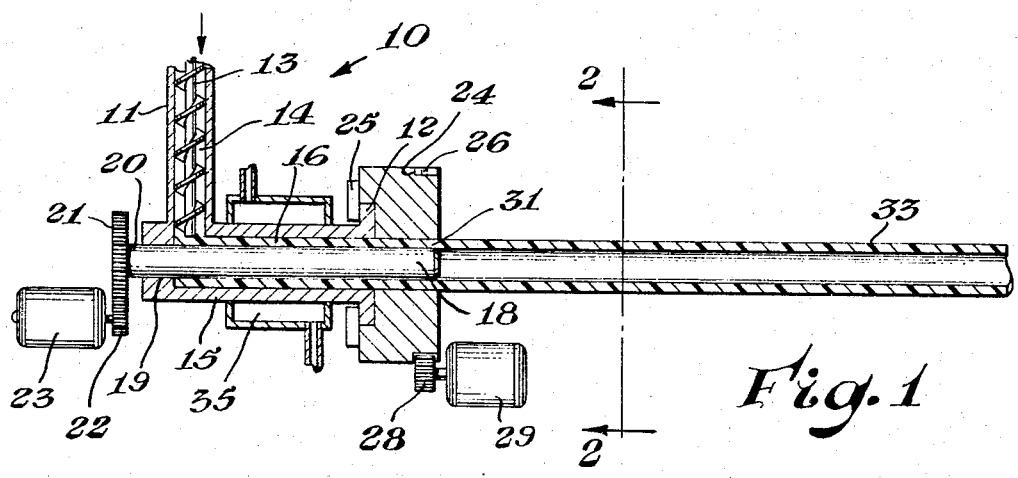
FIGURE 1 is a schematic sectional representation of extrusion in accordance with the present invention.

In FIGURE 1 there is schematically represented an extrusion apparatus generally designated by the reference numeral 10. The apparatus 10 comprises an extruder barrel 11. Disposed within the extruder barrel 11 is an extruder screw 13 forwarding a heat plastified thermoplastic resinous material 14. A crosshead 15 is affixed to the terminal portion of the extruder barrel 11. The crosshead 15 is provided with an internal passageway 16 within which there is disposed a rotating mandrel 18. The rotating mandrel 18 is rotatably supported by the crosshead bearing 19. A means to rotate the mandrel 18 is affixed to the portion 20 of the mandrel extending beyond the crosshead 15. Affixed to the portion 20 of the mandrel 18 is a spur gear 21, which is in operative engagement with a pinion gear 22, which in turn is rotated by the gear head motor 23. Opposite the crosshead bearing 19 the crosshead 15 terminates in a bearing flange 12. A die 24 is rotatably secured to the bearing flange 12 by means of the retainer 25 affixed to the die 24. Means to rotate the die 24 comprises a spur gear 26 integral with the body of the die 24 which is in operative engagement with the pinion gear 28. The pinion gear 28 is in turn rotated by the gear head motor 29. The die 24 and the mandrel 18 in combination define an annular passageway 31 through which the thermoplastic resinous material 14 is extruded to form the tubular article 33. Beneficially a temperature control jacket 35 may be disposed about the crosshead 15.

Figure 2:
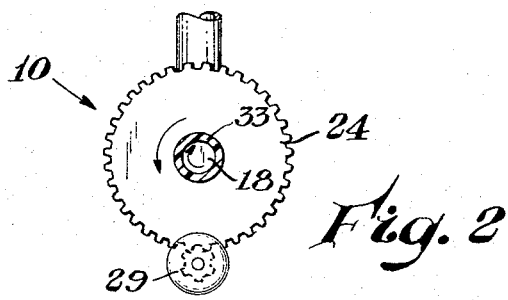
FIGURE 2 is an end view of the annular die of FIGURE 1.

In FIGURE 2 there is illustrated an end view of the apparatus 10 taken along the line 2—2 of FIGURE 1 showing the relative direction of rotation of the die 24 and the mandrel 18.

Figure 3:
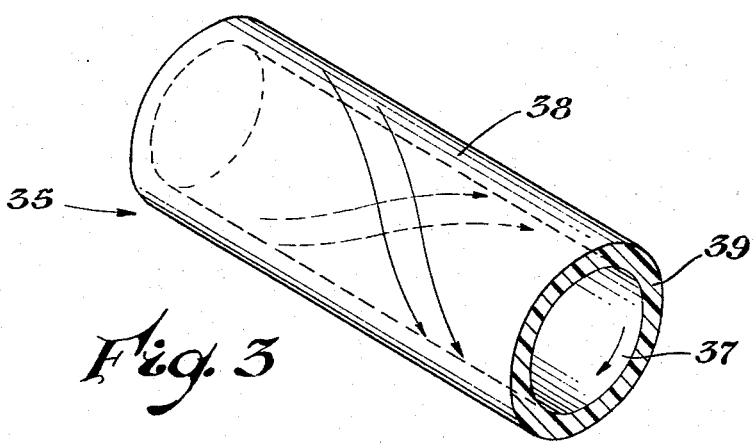
FIGURE 3 is a schematic isometric representation of a tube or pipe of the present invention.

In FIGURE 3 there is illustrated an isometric representation of a thermoplastic resinous tube in accordance with the invention generally designated by the reference numeral 35. The tube 35 defines an inner generally cylindrical surface 37, an outer cylindrical surface 38 and a wall 39. The arrows on the surface 38 designate the direction of orientation within that surface whereas the arrows situated on the surface 37 similarly indicate the direction of orientation on that surface. The method of the present invention can be best understood by reference to FIGURES 1, 2 and 3 wherein a thermoplastic resinous material is extruded at suitable extrusion temperatures to form a tube substantially in the manner of conventional extrusion apparatus with the exception that the die 24 and the mandrel 18 are rotated in opposite directions in such a manner as to effectively twist the internal and external surfaces of the tube in opposite circumferential directions giving rise to a resultant product which has non-linear orientation. It is critical in the practice of the present invention that neither the mandrel-plastic interface nor the die-plastic interface be lubricated to a degree sufficient to prevent the interior or exterior surfaces of the plastic tube from being rotated with respect to each other. Thus effectively the wall of the plastic article being extruded is placed under a circumferential shear force as well as the linear shear force generated by the expulsion of the plastic material from the die. The resultant orientation pattern of such a tube, for example, if produced utilizing the die rotation as shown in FIGURE 2 would be to provide a helically oriented interior surface having a generally right hand helical pattern. The external surface would be oriented in a left handed helical pattern.

The portions of the wall lying between the two surfaces are oriented in a manner generally lying between the orientation pattern of the outer surface and the inner surface and in general having somewhat less of a helical pattern than either of the surfaces. Extrusion temperatures and conditions for the practice of the present invention in general are substantially similar to those employing the conventional non-rotating non-orienting dies or the conventional rotating non-orienting dies. Oftentimes the temperature within the crosshead may be maintained slightly lower than in conventional processes because of the minor amount of heat generated in the extruder by the rotational shear imparted to the plastic by the rotating die and mandrel. Pipes and tubes extruded in accordance with the foregoing description are found to have substantially higher burst strengths, beam strengths and compressional strength than pipe extruded in accordance with known practice and without surface orientation. Although the invention has been described utilizing both a rotating mandrel and a rotating die it is readily apparent that significant benefits and advantages are achieved by the orientation introduced either by utilizing a rotating die or a rotating mandrel. When this technique is utilized, a single helical pattern is generated. For example, if in the apparatus of FIGURE 1 the die 24 is stationary and the mandrel 18 is rotated, a right handed helical orientation would occur within the pipe where the inner surface would be provided with a helical orientation and the external surface will have a linear orientation. This embodiment is particularly advantageous wherein the pipe or tube will be under external radial compressive force with a rotating external die. The helical orientation will be at a maximum at the external surface and will be reduced to about zero at the internal surface. This embodiment is particularly useful wherein the pipe is adapted to withstand internal pressure. However, most advantageous is the embodiment wherein helical orientation is applied both to the internal surface and to the external surface and the orientation is of opposite hand.

Generally in the practice of the present invention it is desirable to orient one surface of the pipe to a sufficient degree that the helical pattern covers about 180° of the cylindrical surface in a length of about 5 diameters. Beneficially, for maximum strength in all directions, orientation of the surfaces should be about 360° in a distance of 4 diameters. For example, if a tube is 3 inches in diameter the orientation would be 1 turn per foot.

The method of the present invention is readily practiced using a wide variety of thermoplastic resinous materials including polyvinylchloride, polyethylene, polypropylene, resinous copolymers of ethylene and propylene, polystyrene, copolymers of styrene and other monomers such as styrene and acrylonitrile, styrene methyl acrylate and the like. Also beneficially employed are polymethyl methacrylate, and copolymers of methyl acrylate with other monomeric materials copolymerizable therewith, linear polyamids such as those prepared by the condensation of hexamethylene diamine and adipic acid, polycaprolactam, and the like.

Particularly advantageous and beneficial bodies in accordance with the invention are prepared when filamentary reinforcing materials are employed such as, for example, glass fiber and the like. Typical thermoplastic resinous materials which may be utilized include the alkenyl aromatic resins typified by polystyrene, styrene copolymers, blends and graft copolymers of styrene and rubber and the like. The invention is readily practiced utilizing polyvinylchloride, vinylidene chloride copolymers such as are generally known as sarans; superpolyamides such as Nylon 66 (a condensation product of hexamethylene diamine and adipic acid), the polyolefins including polyethylene, polypropylene and resinous copolymers thereof, ethyl cellulose, cellulose acetate, rubbers both natural and synthetic including polybutadiene, polyisoprene and including the chlorinated derivatives, mixtures thereof, and the like.

A wide variety of filamentary reinforcing agents may be utilized including certain thermoplastic materials when utilized with other resinous materials which have a significantly lower heat-forming temperature than does the reinforcing material. Particularly advantageous and beneficial are the thermoplastic resinous compositions utilizing filamentary glass or Fiberglas as a reinforcing medium. Beneficially such filaments are used in lengths from about 0.05 inch to about 2 or more inches depending upon the characteristics of the product desired and the equipment available. Usually, however, the advantageous range is from about 0.1 inch to about 0.75 inch. Polycarbonate resins are also beneficially employed.

The particularly suitable polymers for use in the present invention are those that, when heat plastified, have a viscosity of between about 300 poise and about $10^6$ poise. If the viscosity range is below about 300 poise, generally the filamentary material is prone to separate under the influence of gravity and the clearances required for pumping and forwarding in an extruder become so close that considerable fiber damage is done and a beneficial product does not result. If the heat plastified resin has a viscosity greater than about $10^6$ poise, the stresses placed on the reinforcing material are often too great and significant strength is lost in the resultant product. Even with the lower viscosity materials, regions of high shear must be avoided. Other factors may reduce the reinforcing filaments in length such as, for example, a small extrusion orifice wherein the polymeric material is being extruded under conditions which cause turbulence. If the polymer is required to pass over a sharp edge, such as a rectangular edge of a hole formed normal to the die plate, the fibers adjacent the sharp edges are subjected to severe shear. When such filamentary reinforced materials are employed to prepare tubular articles in accordance with the invention as presently claimed, the filaments are oriented in generally the same direction and manner as the polymeric material forming the body and the reinforcing fibers or filaments of the inner surface are substantially parallel to each other, those of the outer surface are substantially parallel to each other, and the fibers of the outer surface and inner surface are disposed in angular relationship, greatly increasing the burst strength of the pipe over and above that of an unoriented material. For example, a 2 inch electrically heated extruder was fed with a polyethylene admixed with 10 weight percent of ¼ inch long chopped glass fiber roving, and extruded to form a tube 2 inches in diameter and having a quarter inch wall thickness. The tube was extruded using an internal mandrel rotation rate of 10 revolutions per minute and an external rate of 10 revolutions per minute in the opposite direction. The extrude was passed to a water bath having a temperature of 17° centigrade spaced about 3 inches from a downwardly extruded die. A sample of the pipe had a burst strength of 6,700 pounds per square inch.

The foregoing experiment is repeated with the exception that the dies are not rotated. A substantially lower burst strength is obtained.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In an extruded synthetic resinous thermoplastic cylindrical tubular object having linear zones of weakness which extend in a generally longitudinal direction, the improvement which comprises providing generally helical orientation of the portions of the object lying between the inner surface and the outer surface, the helical pattern of orientation increasing toward the surface, and the helical pattern of orientation adjacent the inner surface being of opposite hand to the helical pattern of orientation on the outer surface.

2. The object of claim 1 wherein said helical orientation is at least 180° in a length of pipe 5 times its diameter.

3. The body of claim 1 wherein the orientation is at least 360° in a pipe at least 4 diameters in length.

4. The body of claim 1 wherein a filamentary reinforcing material is included embedded within the thermoplastic body.

References Cited by the Examiner

UNITED STATES PATENTS

| | | | |
|---|---|---|---|
| 1,677,808 | 7/1928 | Alassio et al. | 138—177 |
| 1,845,249 | 2/1932 | Derby | 264—209 |
| 2,172,426 | 9/1939 | Weingand et al. | 264—209 X |
| 2,307,817 | 1/1943 | Austin. | |
| 2,613,993 | 10/1952 | Holden | 138—118 X |
| 3,003,194 | 10/1961 | Hunkeler | 264—209 X |
| 3,008,187 | 11/1961 | Slade. | |

LAVERNE D. GEIGER, *Primary Examiner.*

C. HOUCK, *Assistant Examiner.*